United States Patent Office
3,486,531
Patented Dec. 30, 1969

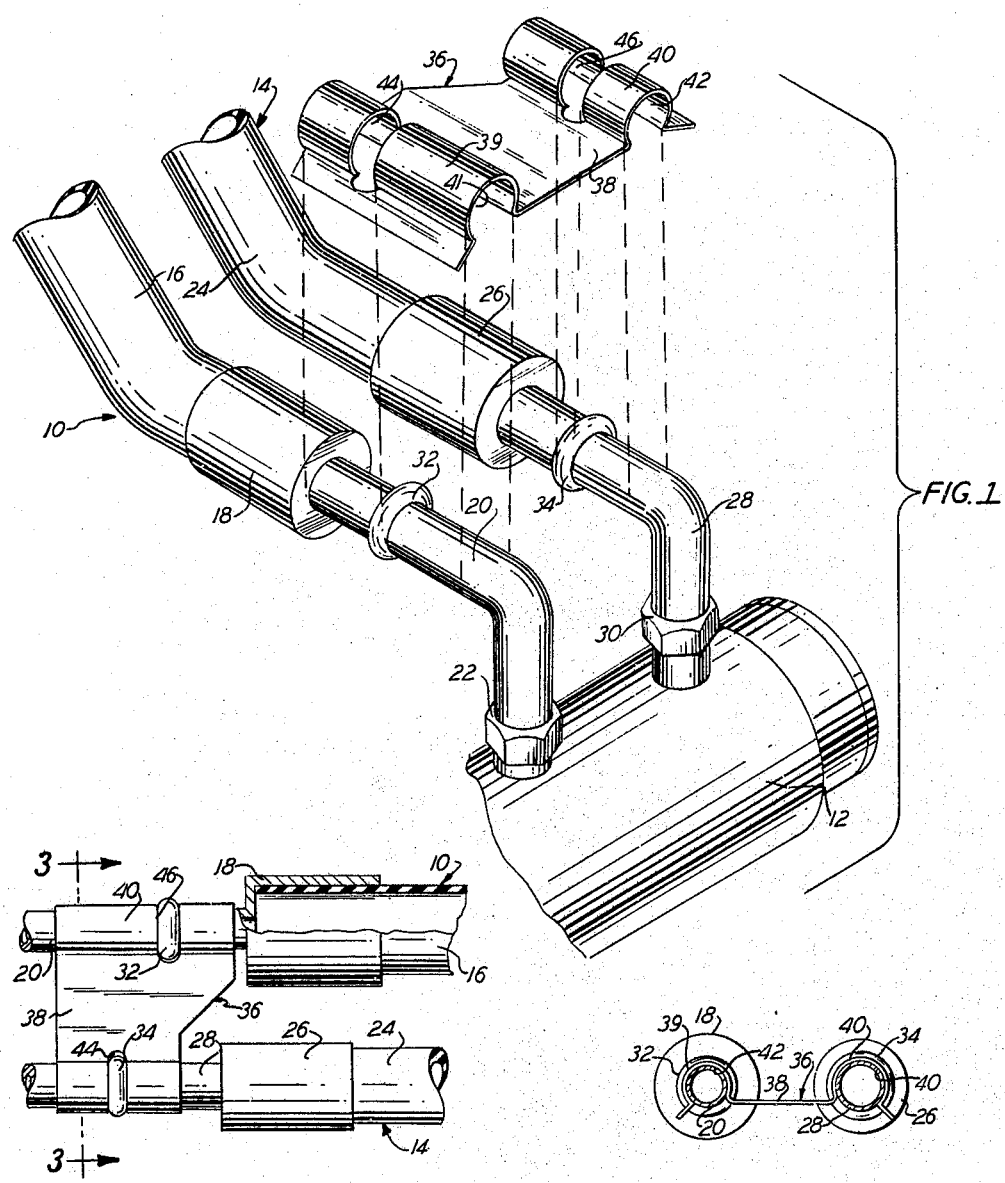

3,486,531
POSITIVE INDEXED TUBE CONNECTION
Edward C. Nalodka, Allen Park, Mich., assignor to Ford Motor Company, Dearborn, Mich., a corporation of Delaware
Filed Dec. 18, 1967, Ser. No. 691,359
Int. Cl. F16l 55/00
U.S. Cl. 138—103     7 Claims

ABSTRACT OF THE DISCLOSURE

A multiple tube assembly comprising a pair of tubes and a spring clip engaging said tubes. The spring clip has wall portions forming semi-cylindrical recesses that are constructed to grip the tube. Circumferential ridges are formed on the tubes to engage slots formed in the walls of the recesses. This construction provides positive axial location of the tubes.

BACKGROUND OF THE INVENTION

In certain complex machinery employing hydraulic or pneumatic pressure devices, a problem is presented in orienting the tubing that is used to convey the pressure fluid. It is necessary to position the tubing so that it does not interfere with moving parts and, in addition, does not rub against high temperature components that might damage the tubing or the fluid conveyed in the tubing.

A typical situation where this problem is presented is in the use of hydraulic tubing in a motor vehicle to convey fluid pressure to the power steering valve. In such an application, it is necessary to orient the tubing so that it does not rub against the engine exhaust manifold or interfere with the many moving parts that are present in the engine compartment.

In view of this known problem, the present invention is directed toward a simple and inexpensive means for constraining the hydraulic tubing of a device or mechanism.

BRIEF SUMMARY OF THE INVENTION

The objects of the invention are achieved in a multiple tube assembly by a spring clip having a pair of channel shaped recesses that are constructed to engage a pair of tubes with a snap action. A slot is formed in the wall of one of the recesses and is constructed to engage an upstanding ridge formed on the one tube. This engagement provides a structure in which the tubes are positively located in a lateral and axial position.

BRIEF DESCRIPTION OF THE DRAWINGS

The many objects and advantages of the present invention will become apparent upon consideration of the following description and the accompanying drawings, in which:

FIGURE 1 is a perspective view of a multiple tube assembly, partially exploded, constructed in accordance with this invention;

FIGURE 2 is a top plan view of the multiple tubing assembly of FIGURE 1;

FIGURE 3 is an elevational view in section taken along section lines 3—3 of FIGURE 2;

DETAILED DESCRIPTION OF THE INVENTION

Figure 5:
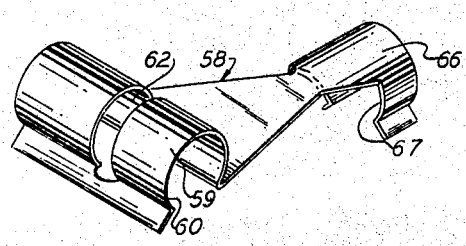
FIGURE 5 is a perspective view of a spring clip for use in the multiple tube assembly of FIGURE 4.

Referring now to the drawings, wherein the presently preferred embodiments of this invention are disclosed, FIGURE 1 discloses a multiple tube assembly. In FIGURE 1, a hydraulic inlet tubing assembly 10 is connected to a pressure fluid device such as a power steering valve 12 for a motor vehicle. In this construction, the other end of the tubing 10 might be connected to a power steering pump. A return tubing 14 is also connected to the valve 12 and may serve to convey hydraulic fluid from the valve 12 to the pump reservoir. The tubing assembly 10 includes a rubber hose 16 that is connected to a ferrule portion 18 of a metal tube 20. A conventional threaded fitting 22 secures the end of the tubing 20 to the valve body 12. In a similar fashion, the return tubing 14 includes a rubber hose 24 that is secured to a ferrule 26 formed at one end of the metal tube 28. Tube 28 is secured to the valve body 12 by a threaded fitting 30. As noted in FIGURE 1, the metal tubes 20 and 28 are provided with upstanding circumferential ribs 32 and 34, respectively.

A spring clip 36 has a body portion 38 and a pair of curved wall portions 39 and 40 that define semi-cylindrical recesses 41 and 42. The clip 36 is formed by a stamping operation from a sheet of flat spring metal. The semi-cylindrical recesses 41 and 42 have a generally C-shape as seen in cross section (see FIGURE 3). In their normal unstressed condition, the diameters of the recesses 41 and 42 are slightly smaller than the diameters of the tubes 20 and 28, respectively.

Slots 44 and 46 are cut through the walls 39, 40 of the recesses 41, 42 in a direction perpendicular to the axis of the recesses. With this construction, the clip 36 may be snapped onto the tubes 20 and 28 with the walls 39, 40 of the recesses 41, 42 grasping the tubing and with the upstanding ribs 32 and 34 being situated within the slots 44 and 46.

The snap engagement of the tubes 20 and 28 in the recesses 41 and 42 determines in a positive manner the side-by-side relationships of the tubing 20 and 28. The engagement of the ribs 32 and 34 in the slots 44 and 46 positively indexes the axial location of the tubes 20 and 28.

With this multiple tube assembly, the connection of the hydraulic tubings 10 and 14 to the valve 12 is facilitated inasmuch as the ends of the tubing 20 and 28 are positively oriented with respect to each other by the spring clip 36. In addition, the pre-assembly of the tubing 10 and 14 with the clip 36 orients the tubings after their connection to the valve body 14 so as to avoid undesirable engagement with other components of the mechanism such as the hot exhaust manifold in an engine compartment.

Figure 4:
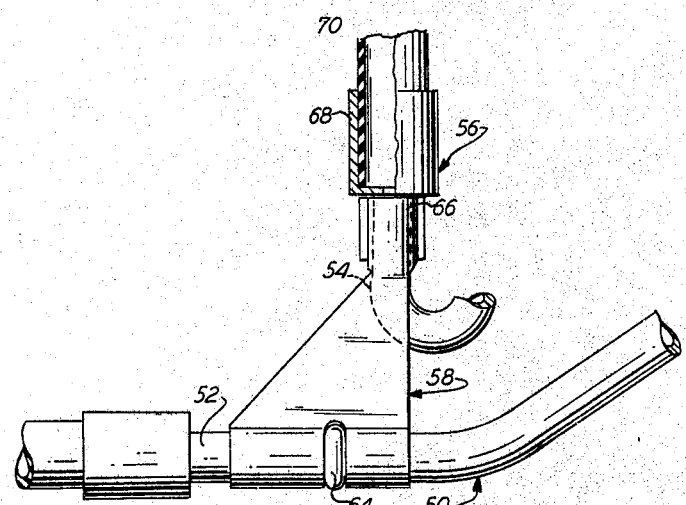
FIGURE 4 is a top plan view of an alternate embodiment of the invention.

FIGURES 4 and 5 illustrate an alternate embodiment of this invention. In this embodiment, a tubing 50 has a metal tube portion 52 that is arranged generally perpendicular to a tube portion 54 of the second tubing 56. A modified spring clip 58 maintains the orientation and relationship of the tubes 50 and 56.

The clip 58 has a first wall portion 59 forming a semi-cylindrical recess 60 at one end. The recess 60 has a slightly smaller diameter than the body portion 62 of tube 60 and, therefore, when the two are engaged they are held in tight contact. As in the embodiment of FIGURE 1, a slot 62 is formed in the wall of the recess 60 to engage a raised rib 64 formed in the portion 52 of tubing 50.

A wall portion 66 of clip 58 is contoured to provide a second semi-cylindrical recess 67 as seen in FIGURES 4 and 5. The recess 67 runs generally perpendicular to the axis of the recess 60 in the plan view. It is sized so that the wall portion 66 has a snap engagement about the tube 54. As in the previously described embodiment, the tubing 56 includes a ferrule 68 fitted about the rubber hose 70. The shoulder formed between the ferrule 68 and the metal tube 54 constitutes a positioning means for the clip 58. The end of the portion 66 of the clip 58 is pushed snug against the shoulder between the ferrule 68 and tube 54.

In this embodiment, the clip 58 maintains the tubings 50 and 56 in positive orientation with respect to their axes and also with respect to their lateral spacing.

The foregoing description presents the presently preferred embodiment of this invention. Modifications and alterations may occurs to those skilled in the art that will come within the scope and spirit of the following claims.

I claim:

1. A multiple tube assembly for conveying a pressure fluid comprising a first tube having a flexible portion and a rigid end portion, a second tube having a flexible portion and a rigid end portion and a clip means interconnecting said tubes, a fluid operating device having a rigid housing, said rigid end portions being secured to said housing, said clip means being spaced from said housing, said clip means having spaced apart spring portions constructed to engage said rigid portion of said first tube and said rigid portion of said second tube, said rigid portion of said first tube and said clip means having interfitting detent means constructed to position said clip means axially with respect to said first tube.

2. A multiple tube assembly according to claim 1 and including:
said second tube and said clip means having second interfitting detent means constructed to position said clip means axially with respect to said second tube.

3. A multiple tube assembly according to claim 1 and including:
said second tube having a shoulder formed thereon, the edge of one of said spring portions being positioned adjacent said shoulder.

4. A multiple tube assembly according to claim 1 and including:
one of said spring portions comprising a wall portion defining a semi-cylindrical recess, said recess normally having a smaller internal diameter than the external diameter of said rigid portion of said first tube, said wall portion being constructed to fit about said rigid portion of said first tube with said rigid portion of said first tube being seated in said recess.

5. A multiple tube assembly according to claim 1 and including:
said clip means being formed of sheet metal, one of said spring portions comprising a wall portion defining a semi-cylindrical recess, said recess normally having a smaller internal diameter than the external diameter of said rigid portion of said first tube, said wall portion being constructed to fit about said rigid portion of said first tube with said rigid portion of said first tube being seated in said recess, said clip means having a second wall portion defining a second recess, said second recess having a smaller internal diameter than the external diameter of said rigid portion of said second tube, said second wall portion being constructed to be positioned about said rigid portion of said second tube.

6. A multiple tube assembly according to claim 1 and including:
said clip means being formed of sheet metal, one of said spring portions comprising a wall portion defining a semi-cylindrical recess, said recess normally having a smaller internal diameter than the external diameter of said rigid portion of said first tube, said wall portion being constructed to fit about said rigid portion of said first tube with said rigid portion of said first tube being seated in said recess, said detent means comprising a slot formed in said wall portion and a single upstanding annular rib formed on said rigid portion of said first tube, said rib being seated in said slot.

7. A multiple tube assembly for conveying a pressure fluid comprising a first tube having a flexible portion and a rigid end portion, a second tube having a flexible portion and a rigid end portion and a clip means interconnecting said tubes, a fluid operating device having a rigid housing, said rigid end portions being secured to said housing, said clip means being spaced from said housing, said clip means having spaced apart spring portions constructed to engage said rigid portion of said first tube and said rigid portion of said second tube, said rigid portion of said first tube and said clip means having interfitting detent means constructed to position said clip means axially with respect to said first tube, one of said spring portions comprising a wall portion defining a semi-cylindrical recess, said recess normally having a smaller internal diameter than the external diameter of said rigid portion of said first tube, said rigid portion of said first tube being seated in said recess, said detent means comprising a slot formed in said wall portion and an upstanding annular rib formed on said tube, said rib being seated in said slot, said clip means having a second wall portion defining a second recess, said second recess having a smaller internal diameter than the external diameter of said rigid portion of said second tube, said second wall portion being constructed to be positioned about said rigid portion of said second tube, said second wall portion having a slot formed therein, said rigid portion of said second tube having an upstanding annular rib, said rib of said rigid portion of said second tube being seated in said slot of said second wall portion.

References Cited

UNITED STATES PATENTS

| | | | |
|---|---|---|---|
| 566,544 | 8/1896 | Smith | 248—68 |
| 722,956 | 3/1903 | Doughty | 24—81.35 |
| 2,256,107 | 9/1941 | Zadek. | |
| 3,052,748 | 9/1962 | Curtiss | 248—68 |
| 3,150,539 | 9/1964 | Wallis | 248—74 |
| 3,194,524 | 7/1965 | Trumbull | 248—68 |

FOREIGN PATENTS 340,675   10/1959   Germany.

HERBERT F. ROSS, Primary Examiner

U.S. Cl. X.R.

24—81; 138—106; 248—68, 74